United States Patent [19]

Almond et al.

[11] Patent Number: 4,664,713
[45] Date of Patent: May 12, 1987

[54] COMPOSITION FOR AND METHOD OF ALTERING THE PERMEABILITY OF A SUBTERRANEAN FORMATION

[75] Inventors: Stephen W. Almond; David J. Hanlon, both of Duncan, Okla.

[73] Assignee: Halliburton Company, Duncan, Okla.

[21] Appl. No.: 825,110

[22] Filed: Mar. 31, 1986

Related U.S. Application Data

[62] Division of Ser. No. 607,363, May 4, 1984, Pat. No. 4,606,772.

[51] Int. Cl.$^4$ .................. C08L 5/00; E21B 33/13
[52] U.S. Cl. .................. 106/209; 106/194; 166/294; 523/130

[58] Field of Search ............ 106/194, 206; 166/294; 523/130

[56] References Cited

U.S. PATENT DOCUMENTS

| | | | |
|---|---|---|---|
| 4,242,506 | 12/1980 | Schweiger | 106/194 |
| 4,309,535 | 1/1982 | Majewicz | 106/194 |
| 4,524,829 | 7/1985 | Hanlon et al. | 166/294 |

*Primary Examiner*—Theodore Morris
*Attorney, Agent, or Firm*—Robert A. Kent

[57] ABSTRACT

A crosslinking composition and method for reducing the permeability of a subterranean formation. The crosslinking composition comprises aluminum cations having a valence of 3+ and zirconium cations having a valence of 4+.

12 Claims, No Drawings

COMPOSITION FOR AND METHOD OF ALTERING THE PERMEABILITY OF A SUBTERRANEAN FORMATION

This application is a division, of application Ser. No. 607,363, filed 05/04/84 now U.S. Pat. No. 4,606,772.

BACKGROUND OF THE INVENTION

A. FIELD OF THE INVENTION

This invention relates to a method of treating a subterranean formation of non-uniform permeability, and more particularly concerns a method of reducing the permeability of subterranean formations to water thereby promoting better control of fluid injection patterns in the secondary or tertiary recovery of hydrocarbons and achieving water reduction in producing wells and thus reducing the quantity of water recovered from a subterranean formation penetrated by a well bore whereby the relative production rate of the hydrocarbons is increased.

B. DESCRIPTION OF THE PRIOR ART:

Since only a portion of the oil contained in a subterranean reservoir can be recovered by primary methods, it has become general practice to employ various secondary or tertiary recovery techniques to produce the additional quantities of oil not economically recovered by primary methods. Of the various secondary or tertiary recovery methods available, one of the most widely practiced techniques is the displacement of oil from the reservoir with a driving fluid such as a floodwater injected for that purpose. Normally, in carrying out the flooding process, input or injection wells are utilized. These wells can be old existing wells or can be wells which are newly drilled into the oil-producing strata. The injection wells locations with reference to the production wells are selected to afford a desired flood pattern, the selected pattern depending in part upon field conditions, the locations of existing wells, and the operator's preference. Aqueous drive fluids, such as water, brine, or a viscous aqueous fluid are forced into the input wells under pressure, and out into the surrounding oil bearing strata towards the producing well or wells. While waterflooding has been rather widely practiced in recent years, it is not without considerable operating problems and economical limitations particularly those associated with low oil recoveries in proportion to the amount of water injected. Various surfactant and solvent floods have been proposed as means for recovering additional quantities of oil over that recoverable by conventional waterflooding. However, these processes face serious operating problems when practiced in heterogeneous formations containing strata or channels having permeability substantially higher than the bulk of the formation.

One of the major problems encountered in a flooding operation is the breakthrough of the flooding medium from the flood front to the producing well relatively early in the displacement process and rapidly increasing producing water/oil ratios following the initial breakthrough. These difficulties result from the displacing medium channeling or fingering through the oil-bearing structure to the producing well, thus bypassing large zones of the oil-bearing strata. The reason for the channeling of the flooding medium to the producing wells and the resulting low oil recovery is due in part to the peculiar structure of the oil-bearing strata. Underground oil reservoirs, in most cases, consist of layers of sand or rock and, since no reservoir rock is perfectly uniform in composition and structure, the permeability will vary across the rock face or strata. Also, fractures, cracks, and other abnormalities can promote channeling of the displacement of the fluid.

In the normal flooding operation, maximum oil recovery is obtained when the driven fluid goes up in a wide bank in front of the driving fluid which moves uniformly towards the producing well. To keep this bank of oil intact and constantly moving towards the producing well, a substantially uniform permeability must exist throughout the strata. If this uniform permeability does not exist, or is not provided, the flooding fluid will seek the areas of high permeability, and channeling occurs with the subsequent loss of some driving fluid energy and the appearance of excessive amounts of driving fluid in the producing well. Moreover, as the more permeable strata are depleted, the driving fluid has a tendency to follow channels and further increase the consumption of the flooding medium to the point where the process becomes uneconomical. It is, therefore, desirable to operate at a drive fluid to oil ratio that is as low as possible.

Another problem associated with the production of oil from oil-bearing formations containing highly permeable water channels communicating the production well with the water zone is the intrusion of water into the well. Not only does this water intrusion cause production and disposal problems, but more importantly the beneficial effect of the natural water drive is at least, in part, lost thereby adversely affecting oil recovery.

It is advantageous to reduce the permeability of the water channels so as to render the formation more uniformly permeable and to increase the unit efficiency of the water drive, or alternatively to shut off the water intrusion.

Many processes have been proposed for reducing the permeability of a subterranean formation. For instance, U.S. Pat. No. 3,762,476 discloses that the quantity of water recovered from a subterranean formation penetrated by a well bore can be reduced by injecting into the subterranean formation a first thickened aqueous solution, a complexing ionic solution of multivalent cations and retarding anions, a brine slug, and a second thickened aqueous solution. Complexing ionic solutions disclosed in the patent have a multivalent metal cation selected from the group consisting of $Fe^{2+}$, $Fe^{3+}$, $Al^{3+}$, $Ti^{4+}$, $Zn^{2+}$, $Sn^{4+}$, $Ca^{2+}$, $Mg^{2+}$, and $Cr^{3+}$ and a retarding anion selected from the group consisting of acetate, nitrilotriacetate, tartrate, citrate and phosphate.

U.S. Pat. No. 3,833,061 discloses a method for selectively reducing the permeability of an oil-wet subterranean formation penetrated by at least one well bore by passing an oxidizing agent through and into contact with the formation for oxidizing and removing hydrocarbons from the surfaces of the formation and thereafter contacting the treated formation surfaces with a crosslinked polymer. The patent discloses the use of aluminum citrate as a crosslinking composition.

SUMMARY OF THE INVENTION

By the present invention, crosslinking compositions containing aluminum cations having a valence of 3+ and zirconium cations having a valence of 4+ are provided. These crosslinking compositions when mixed with an aqueous fluid containing a polymer having a molecular weight greater than 100,000 and containing carboxyl functionality produce a viscosity increase in the fluid in excess of the individual aluminum and zirconium components of the crosslinking compositions.

The present invention also provides a method of reducing the permeability of a subterranean formation penetrated by at least one well bore by treating the formation surfaces with a crosslinked polymer. The method of the invention can be used in either injection wells of water floods or hydrocarbon production wells for the purpose of reducing the water-oil ratio produced therefrom, e.g., reduce the mobility of water in the well bore area.

In one embodiment of the present invention, the permeability of the subterranean formation is altered by contacting the formation with an aqueous mixture comprising a water dispersible hydrophilic organic polymer having a molecular weight greater than 100,000 and containing carboxyl functionality and a crosslinking composition comprising:

(a) water;
(b) a first ingredient containing aluminum cations having a valence of 3+ and comprising aluminum acetate;
(c) a second ingredient containing zirconium cations having a valence of 4+ and selected from the group consisting of:
 (i) zirconium lactate;
 (ii) a zirconium admixture comprising:
  (A) a zirconium compound selected from the group consisting of zirconium oxychloride, zirconium acetate, zirconium tetrachloride, zirconium orthosulfate, zirconium carbonate, zirconium ammonium carbonate, and mixtures thereof;
  (B) an alpha-hydroxy acid represented by the following formula:

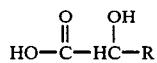

wherein:
R is selected from the group consisting of hydrogen and an alkyl group having 1 to about 3 carbon atoms; and,
  (C) an amine compound represented by the formula:

wherein:
$R_1$ is a hydroxyalkyl group having 1 to about 3 carbon atoms;
$R_2$ is selected from the group consisting of an alkyl group having 1 to about 3 carbon atoms and a hydroxyalkyl group having 1 to about 3 carbon atoms;
$R_3$ is selected from the group consisting of hydrogen, an alkyl group having 1 to about 3 carbon atoms and a hydroxyalkyl group having 1 to about 3 carbon atoms; and,
 (iii) mixtures of (i) and (ii).

The zirconium cations and aluminum cations are present in said crosslinking composition in an amount sufficient to produce a weight ratio of zirconium cations to aluminum cations of from about to 1 to about 10 to 1.

In another embodiment of the present invention, the subterranean formation is contacted sequentially with a first mixture comprising water and a water dispersible hydrophilic organic polymer having a molecular weight greater than 100,000 and containing carboxyl functionality, optionally a spacer fluid, an aqueous crosslinking composition comprising:

(a) water;
(b) a first ingredient containing aluminum cations having a valence of 3+ and comprising aluminum acetate;
(c) a second ingredient containing zirconium cations having a valence of 4+ and selected from the group consisting of:
 (i) zirconium lactate;
 (ii) a zirconium admixture comprising:
  (A) a zirconium compound selected from the group consisting of zirconium oxychloride, zirconium acetate, zirconium tetrachloride, zirconium orthosulfate, zirconium carbonate, zirconium ammonium carbonate, and mixture thereof;
  (B) an alpha-hydroxy acid represented by the following formula:

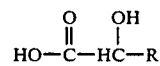

wherein:
R is selected from the group consisting of hydrogen and an alkyl group having 1 to about 3 carbon atoms;
  (C) an amine compound represented by the formula:

wherein:
$R_1$ is a hydroxyalkyl group having 1 to about 3 carbon atoms;
$R_2$ is selected from the group consisting of an alkyl group having 1 to about 3 carbon atoms and a hydroxyalkyl group having 1 to about 3 carbon atoms;
$R_3$ is selected from the group consisting of hydrogen, an alkyl group having 1 to about 3 carbon atoms and a hydroxyalkyl group having 1 to about 3 carbon atoms; and,
 (iii) mixtures of (i) and (ii);

wherein said zirconium cations and said aluminum cations are present in said crosslinking composition in an amount sufficient to produce a weight ratio of zirconium cations to aluminum cations of from about 1 to 1 to about 10 to 1; optionally a spacer fluid; and finally with a second mixture comprising water and a hydrophilic organic polymer having a molecular weight greater than 100,000 and containing carboxyl functionality.

The use of the method of the invention results in a reduction in permeability of the subterranean formation.

DESCRIPTION OF THE PREFERRED EMBODIMENTS

Polymers suitable for use in the present invention can generally be described as water dispersible hydrophilic organic polymers having a molecular weight greater than 100,000 and containing carboxyl functionality whereby the polymers can be crosslinked with the crosslinking composition. Examples of such polymers include carboxyalkyl guar wherein the alkyl group has 1 to about 3 carbon atoms, carboxyalkylhydroxyalkyl guar wherein the alkyl groups have 1 to about 3 carbon atoms, xanthan gum, polyacrylamide and polymethacrylamide wherein from about 5 to about 75 percent of the carboxylamide groups of the polyacrylamide and polymethacrylamide are hydrolyzed to carboxyl groups, cellulose ether polymers containing carboxyl functionality, and copolymers resulting from the polymerization of acrylamide or methacrylamide with acrylic acid and/or methacrylic acid.

The polymers used in the present invention are preferably substantially free of crosslinking between the polymer chains. As used herein and in the claims, unless otherwise specified, the term "hydrolyzed" includes modified polymers wherein the carboxyl groups are in the acid form and also polymers wherein the carboxyl groups are in the salt form, provided such salts are water dispersible. Such salts include ammonium salts, alkali metal salts, and others which are water dispersible. Hydrolysis can be carried out in any suitable fashion, for example, by heating an aqueous solution of the polymer with a suitable amount of sodium hydroxide.

Examples of cellulose ethers which can be used to carry out the invention include, for example, carboxyalkyl cellulose ethers such as carboxymethyl cellulose (CMC), and mixed ethers such as carboxyalkylhydroxyalkyl cellulose ethers such as carboxymethylhydroxyethyl cellulose (CMHEC). Many of these cellulose ethers that contain carboxyl functionality are commercially available and are available as the alkali metal salt, usually the sodium salt. The metal is seldom referred to and they are commonly referred to as CMC or CMHEC.

The copolymers of acrylic acid, methacrylic acid or combinations thereof with acrylamide, methacrylamide or combinations thereof are made up with from about 5 to 70 percent by weight of acrylic acid, methacrylic acid and combinations thereof and most preferably from about 10 to about 40 percent by weight of acrylic acid, methacrylic acid and combinations thereof.

Included among the polyacrylamides that can be used in the present invention are polyacrylamides and related polymers which are water soluble. Presently preferred polymers include homopolymers and copolymers of acrylamide and methacrylamide. These polymers can contain from about 5 percent to about 75 percent and preferably about 40 percent of the carboxamide groups hydrolyzed to carboxyl groups.

The most preferred polymer for carrying out the method of the invention is polyacrylamide wherein 7 percent or 30 percent of the carboxamide groups are hydrolyzed to carboxyl groups. The amount of carboxyl functionality will depend on the formation to be treated.

The polymers must have a molecular weight of at least 100,000, but the upper limit of the molecular weight is not critical as long as the polymer is water dispersible and the aqueous gel prepared therefrom can be pumped. Thus, polymers having a molecular weight as high as 20 million or higher, in many said conditions can be used.

The amount of the polymers used in the practice of the invention can vary widely depending on the particular polymer desired, purity of the polymer, and the properties desired in the gels. Generally speaking, amounts in the range of from 0.0025 to about 5.0, preferably from 0.01 to 1.5, or preferably 0.025 to about 0.4 weight percent based on the weight of water in the aqueous mixture can be used. Amounts outside this range, however, can be used. Small amounts of polymer will usually produce liquid mobile gels which can be readily pumped where as large amounts of polymer will usually produce thick, viscous, somewhat elastic gels. The thick gels can be thinned by the dissolution of water to any desired concentration of polymer and this can be done by mechanical means such as stirring, pumping, or by means of a suitable turbulence inducing device to cause shearing such as a jet nozzle. Thus, there is really no fixed upper limit on the amount of polymer which can be used.

The crosslinking composition which is used in the practice of the invention comprises:
(a) water;
(b) a first ingredient containing aluminum cations having a valence of 3+ and comprising aluminum acetate;
(c) a second ingredient containing zirconium cations having a valence of 4+ and selected from the group consisting of:
(i) zirconium lactate;
(ii) a zirconium admixture comprising:
(A) a zirconium compound selected from the group consisting of zirconium oxychloride, zirconium acetate, zirconium tetrachloride, zirconium orthosulfate, zirconium carbonate, zirconium ammonium carbonate, and mixtures thereof;
(B) an alpha-hydroxy acid represented by the following formula:

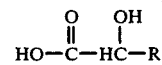

wherein:
R is selected from the group consisting of hydrogen and an alkyl group having 1 to about 3 carbon atoms;
(C) an amine compound represented by the formula:

wherein:
$R_1$ is a hydroxyalkyl group having 1 to about 3 carbon atoms;
$R_2$ is selected from the group consisting of an alkyl group having 1 to about 3 carbon atoms and a hydroxyalkyl group having 1 to about 3 carbon atoms;
$R_3$ is selected from the group consisting of hydrogen, an alkyl group having 1 to about 3 carbon atoms and a hydroxyalkyl group having 1 to about 3 carbon atoms; and,
(iii) mixtures of (i) and (ii).

The zirconium cations and aluminum cations should be present in the crosslinking composition in an amount sufficient to produce a weight ratio of zirconium cations to aluminum cations of from about 1 to 1 to about 10 to 1, and more preferably from about 2 to 1 to about 4 to 1. Most preferably the weight ratio of zirconium cations to aluminum cations is about 2.

The preferred crosslinking composition contains zirconium lactate, which is available from Zirtech, Inc. of Gainesville, Florida, and aluminum acetate which is available from Niacet and the zirconium cations having a valence of 4+ and the aluminum cations having a valence of 3+ are present in the crosslinking composition in an amount sufficient to produce a weight ratio of zirconium cations to aluminum cations of about 2.

When the zirconium admixture is utilized in the crosslinking composition, methods of its preparation are disclosed in copending U.S. patent application 525,597 which is assigned to the assignee of the present invention and is hereby incorporated by reference.

Examples of suitable alpha-hydroxy acids which can be utilized in the zirconium admixture include lactic acid and glycolic acid. The preferred alpha-hydroxy acid is lactic acid.

Examples of suitable amine compounds which can be utilized in the zirconium admixture include diethanolamine, triethanolamine, and dimethylethanolamine. The preferred amine is triethanolamine.

The quantity of zirconium compound having a valence of 4+, acid, and amine used in the zirconium admixture will vary over a wide range. Generally, about 1 mole of zirconium cations having a valence of 4+ is used with about 2 to about 5 moles of the alpha-hydroxy acid and about 1 to 5 moles of the amine.

A particularly preferred zirconium admixture comprises zirconium oxychloride in an amount sufficient to produce one mole of zirconium cations having a valence of 4+, about 2 moles of lactic acid, and about 2 moles of triethanolamine.

The zirconium cations used in the crosslinking composition have a 4+ valence and the aluminum cations have a valence of 3+. Although the crosslinking mechanism is not totally understood, it is believed that the valence of the zirconium and aluminum cations does not change during the crosslinking of the composition with the polymers.

The amount of crosslinking composition used to carry out the method of the invention will vary over a wide range and therefore the amounts will vary according to the formation to be treated. Preferably, however, good results have been achieved when the combined weight of zirconium cations having a valence of 4+ and the aluminum cations having a valence of 3+ are present in the crosslinking composition in amounts of from about 1.0 to about 75.0, more preferably, from about 2.0 to about 50.0 percent by weight of the polymer and most preferably from about 3.0 to about 5.0 percent by weight of the polymer.

The crosslinking composition is prepared preferably by adding to water the first and second ingredients of the crosslinking composition and adjusting the pH of the mixture from about 3 to about 11, and preferably from about 6 to about 8.

Preferably, the crosslinking composition is used in the method of the present invention at a pH of from about 3 to about 11 and more prefereably at a pH of from about 6 to about 8.

The term "water" is used generally herein and in the Claims, unless otherwise specified, to include brines and fresh water.

The crosslinking composition and aqueous mixtures containing the water dispersible hydrophilic organic polymer can be prepared from either fresh water or brine water having high concentrations of multivalent ions such as $Ca^{++}$, $Ba^{++}$, $Mg^{++}$, $CO_3^{=}$, and $SO_4^{=}$. By high concentrations, it is meant at least 300 to about 10,000 ppm by weight of multivalent ions based on the weight of the brine water. This feature is particularly desirable when the performance of the method of the invention is carried out at a location where fresh water is not particularly accessible On some occasions, the surfaces of the formation to be treated are covered with materials such as hydrocarbons. If this covering is removed from the surface prior to the treatment, a treatment wherein the permeability of the formation is reduced is better achieved. Therefore, sometimes an agent is utilized which removes the hydrocarbons from the surfaces of the formation prior to the treatment. Agents which can be used include oxidizing agents such as hydrogen peroxide, potassium permanganate, nitric acid, and the like. These agents are well known in the art and the selection of the agent will depend on the formation to be treated.

In one embodiment of the present invention, the mixture comprising water and the water dispersible hydrophilic organic polymers having a molecular weight greater than 100,000 and containing carboxyl functionality are mixed with the crosslinking composition and the resulting mixture is injected through a well into the subterranean formation. The mixture is directed to that portion of the subterranean formation where it is desired that the permeability be altered. After the injection of the above-described mixture, a spacer fluid is preferably injected into the well to displace the mixture from the tubing and out into the formation. Preferably the volume of the spacer fluid is the volume needed to displace all the treating fluids out in the formation plus five barrels per vertical foot of interval to be treated. The well is then preferably shut-in for a period of time, preferably about 48 hours.

In another embodiment of the present invention, a first mixture comprising water and a water dispersible hydrophilic organic polymer having a molecular weight greater than 100,000 and containing carboxyl functionality is injected through a well into the subterranean formation whereby the polymer contacts that portion of the formation where the change in permeability is desired. Optionally, a spacer fluid such as a brine solution is next injected into the well and thus contacts the formation. After the spacer fluid injection is completed, the crosslinking compound is injected into the well bore and into the formation whereby the crosslinking composition contacts the polymer in the formation. Optionally, a spacer fluid such as brine can be injected into the well and into contact with the formation. Finally, a second mixture comprising water and a water dispersible hydrophilic organic polymer having a molecular weight greater than 100,000 and containing carboxyl functionality is injected into the well and into the formation. The steps of injecting the crosslinking composition and the second organic polymer can be repeated if necessary. The well is then preferably shut-in for a period of time, preferably about 48 hours. This embodiment is used primarily for treating waterflood injection wells.

Spacer fluids that can be used in the present invention are well known in the art and include brine solutions, alkali metal halide solutions and the like.

The amount of total polymer used to carry out the method of the present invention will vary over a wide range depending upon the formation to be treated.

The invention is further exemplified by the examples below and they are presented to illustrate certain specific embodiments of the invention, but are not to be intended to be construed so as to be restrictive of the scope and spirit thereof.

EXAMPLE I

A series of aqueous gels were prepared using the crosslinking composition of the present invention and 7 percent hydrolyzed polyacrylamide.

The gels were prepared by adding 100 grams of either fresh or brine water containing 7 percent hydrolyzed polyacrylamide to a beaker. The aqueous crosslinking composition was prepared using 100 grams of either fresh or brine water. The polyacrylamide solution and crosslinking composition were added together with stirring and viscosity readings were taken at selected time intervals of the resulting composition using a Brookfield Model LVT viscometer, No. 1 spindle, 6 r.p.m. at ambient temperature.

The brine water used in the tests had the following compositions:

| BRINE 1 | |
|---|---|
| Salt | % by Weight |
| Na$_2$SO$_4$ | 0.4 |
| NaHCO$_3$ | 0.1 |
| NaCl | 5.6 |
| MgCl$_2$.6H$_2$O | 3.3 |
| CaCl$_2$.2H$_2$O | 1.1 |

| BRINE 2 | |
|---|---|
| Salt | % by Weight |
| Na$_2$SO$_4$ | 0.002 |
| NaHCO$_3$ | 0.03 |
| NaCl | 1.36 |
| MgCl$_2$.6H$_2$O | 0.141 |
| CaCl$_2$.2H$_2$O | 0.382 |

The aqueous crosslinking compositions used in the tests had the following ingredients:

| Crosslinking Composition Designation | Composition (moles) | Active Metal (% by weight) |
|---|---|---|
| A | Al(OH)$_2$(CH$_3$CO$_2$).$\frac{1}{3}$HBO$_3$ | 4.6 |
| B | Zirconium Oxychloride (1) Lactic Acid (2) Triethanol Amine (2) | 6.4 |
| C | Zirconium Lactate | 5.18 |

The results of these tests are shown in Table I.

TABLE I

| Test No. | Crosslinking Composition (Volume Ratio) | Weight Ratio Crosslinking Composition to Polymer | pH Polymer Solution | Water Used | Time (hr.) | Viscosity (cps) |
|---|---|---|---|---|---|---|
| 1 | B | 3,000/2,500 | 7.4 | Fresh | 15 | 310 |
| 2 | A + B (1:2) | 1,500/2,500 | 7.4 | Fresh | 15 | 20,000 |
| 3 | A | 500/2,500 | 7.4 | Fresh | 15 | 220 |
| 4 | B | 1,500/2,500 | 7.4 | Fresh | 15 | 105 |
| 5 | A | 250/2,500 | 7.4 | Fresh | 15 | 120 |
| 6 | A + B (1:2) | 750/2,500 | 7.4 | Fresh | 15 | 150 |
| 7 | A | 1,000/2,500 | 7.2 | Brine 1 | 3 | 9,200 |
| 8 | A | 500/2,500 | 7.2 | Brine 1 | 3 | 13,000 |
| 9 | A | 250/2,500 | 7.2 | Brine 1 | 18 | 45 |
| 10 | A | 125/2,500 | 7.2 | Brine 1 | 18 | 32 |
| 11 | C | 3,000/2,500 | 7.2 | Brine 1 | 3 | 8,500 |
| 12 | C | 1,500/2,500 | 7.2 | Brine 1 | 3 | 8,000 |
| 13 | C | 750/2,500 | 7.2 | Brine 1 | 15 | 700 |
| 14 | A + C (1:1) | 500/2,500 | 7.2 | Brine 1 | 3 | 19,500 |
| 15 | A + C (1:2) | 500/2,500 | 7.2 | Brine 1 | 18 | 20,000 |
| 16 | A + C (1:3) | 500/2,500 | 7.2 | Brine 1 | 18 | 3,350 |
| 17 | A + C (1:6) | 500/2,500 | 7.2 | Brine 1 | 18 | 720 |
| 18 | A + C (1:1) | 500/2,500 | 9.0 | Brine 1 | 17 | 560 |
| 19 | A + C (1:1) | 500/2,500 | 7.0 | Brine 1 | 17 | 20,000 |
| 20 | A + C (1:1) | 500/2,500 | 5.0 | Brine 1 | 2 | 15,900 |
| 21 | A + C (1:1) | 500/2,500 | 3.0 | Brine 1 | 2 | 11,000 |
| 22 | A + B (1:1) | 500/2,500 | 7.2 | Brine 1 | 4 | 9,900 |
| 23 | A + B (1:2) | 500/2,500 | 7.2 | Brine 1 | 4 | 1,800 |
| 24 | A + B (1:3) | 500/2,500 | 7.2 | Brine 1 | 18 | 320 |
| 25 | A + B (1:6) | 500/2,500 | 7.2 | Brine 1 | 18 | 260 |

EXAMPLE II

A series of tests were performed in the same manner as Example I except that the viscosity of the crosslinking composition was visually observed. The results of these tests are shown in Table II.

TABLE II

| Test No. | Crosslinking Composition (Volume Ratio) | Weight Ratio Crosslinking Composition to Polymer | pH Polymer Solution | Water Used | Time (hr.) | Results |
|---|---|---|---|---|---|---|
| 1 | A + B (1:2) | 1,500/1,000 | 6.7 | Brine 2 | 10 | lipping gel |
| 2 | A + B (1:2) | 750/1,000 | 6.7 | Brine 2 | 10 | lipping gel |
| 3 | A + B (1:2) | 325/1,000 | 6.7 | Brine 2 | 24 | no lipping gel |
| 4 | B | 750/1,000 | 6.9 | Brine 2 | 24 | no lipping gel |
| 5 | A | 500/1,000 | 6.9 | Brine 2 | 24 | no lipping gel |

EXAMPLE III

Tests were conducted to determine the residual resistance factor (RRF) of two cores using the method of the present invention. The cores were connected in series with one another and contained Berea sandstone, and were about 15/16" in diameter and about 4" in length.

The tests were carried out by the following steps:

a. Pump through the cores a brine solution until the differential pressure across the cores is stable. The brine solution comprised Brine 1.

b. Pump through the cores at a constant flow rate of 1 ml/min an aqueous solution comprising 500 ppm of a copolymer of 93.0% by weight acrylamide and 7.0% by weight acrylic acid and 2% by weight of a crosslinking composition. A volume of 100 ml of the aqueous solution was pumped through the cores.

c. Pump a brine solution through the cores until the differential pressure across the cores is stable.

The results of this test were measured in residual resistance factor (RRF).

$$RRF = \frac{\text{permeability before treatment}}{\text{permeability after treatment}}$$

The permeabilities for the RRF were measured by the pumping pressure through the cores, before and after treatment.

The results of these tests are shown in Table III.

TABLE III

| Test No. | Crosslinking Composition (Volume Ratio) | RRF (1st Core) | RRF (2nd Core) |
|---|---|---|---|
| 1 | C | 1.67 | 2.30 |
| 2 | A | 1.57 | 2.36 |
| 3 | A + C (1:1) | 4.4 | 2.1 |

The results of these tests show very efficient diversion using the crosslinking compositions of the present invention.

Although certain preferred embodiments of the invention have been herein described for illustrative purposes, it will be appreciated that various modifications and innovations of the procedures and compositions recited may be effected without departure from the basic principals which underlie the invention. Changes of this type are therefore deemed to lie within the spirit and scope of the invention except as may be necessarily limited by the amended claims or reasonable equivalents thereof.

What is claimed is:

1. A method of altering the permeability of a subterranean formation comprising contacting said formation with an aqueous mixture comprising:
   I. a water dispersible hydrophilic organic polymer having a molecular weight greater than 100,000 and containing carboxyl functionality; and
   II. a crosslinking composition comprising:
      (a) water;
      (b) a first ingredient containing aluminum cations having a valence of 3+ and comprising aluminum acetate;
      (c) a second ingredient containing zirconium cations having a valence of 4+ and selected from the group consisting of:
         (i) zirconium lactate;
         (ii) a zirconium admixture comprising:
            (A) a zirconium compound selected from the group consisting of zirconium oxychloride, zirconium acetate, zirconium tetrachloride, zirconium orthosulfate, zirconium carbonate, zirconium ammonium carbonate, and mixtures thereof;
            (B) an alpha-hydroxy acid represented by the following formula:

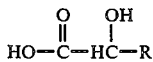

wherein
R is selected from the group consisting of hydrogen and an alkyl group having 1 to about 3 carbon atoms;
            (C) an amine compound represented by the formula

wherein:
R$_1$ is a hydroxyalkyl group having 1 to about 3 carbon atoms;
R$_2$ is selected from the group consisting of an alkyl group having 1 to about 3 carbon atoms and a hydroxyalkyl group having 1 to about 3 carbon atoms;
R$_3$ is selected from the group consisting of hydrogen, an alkyl group having 1 to about 3 carbon atoms, and a hydroxyalkyl group having 1 to about 3 carbon atoms; and,
            (iii) mixtures of (i) and (ii);
wherein said zirconium cations and said aluminum cations are present in said crosslinking composition in an amount sufficient to produce a weight ratio of zirconium cations to aluminum cations of from about 1 to 1 to about 10 to 1 and said crosslinking composition has a pH of from about 3 to about 11.

2. The method recited in claim 1 wherein said water dispersible hydrophilic organic polymer is selected from the group consisting of carboxyalkyl guar wherein the alkyl group has 1 to about 3 carbon atoms, carboxyalkylhydroxyalkyl guar wherein the alkyl groups have 1 to about 3 carbon atoms, xanthan gum, polyacrylamide wherein about 5 to about 75 percent of the carboxamide groups are hydrolyzed to carboxyl groups, polymethacrylamide wherein about 5 to about 75 percent of the carboxamide groups are hydrolyzed to carboxyl groups, cellulose ethers, a copolymer of about 5 to about 70 percent by weight acrylic acid or methacrylic acid copolymerized with acrylamide or methacrylamide, and mixtures thereof.

3. The method recited in claim 2 wherein said second ingredient is selected from the group consisting of zirconium lactate and an admixture comprising about one mole of zirconium oxychloride, about 2 moles of lactic acid, and about 2 moles of triethanolamine.

4. The method recited in claim 2 wherein said pH of said crosslinking composition is from about 4 to about 11.

5. The method recited in claim 2 wherein the ratio of zirconium cations to aluminum cations is about 0.5.

6. The method recited in claim 5 wherein the zirconium cations and aluminum cations in said crosslinking composition are present in the range of from about 3.0 to about 5.0 percent by weight of the polymer.

7. The method recited in claim 6 wherein said polymer of said first and second mixtures is present in said aqueous mixture in the range of from about 0.0025 to about 5.0 weight percent of water.

8. The method recited in claim 7 wherein said polymer is selected from the group consisting of polyacrylamide wherein 7 percent of the carboxamide groups are hydrolyzed to carboxyl groups, polyacrylamide wherein 30 percent of the carboxamide groups are hydrolyzed to carboxyl groups and mixtures thereof.

9. A method of altering the permeability of a subterranean formation comprising:
sequentially contacting the formation with:
   I. a first aqueous mixture comprising a water dispersible hydrophilic organic polymer having a molecular weight of at least 100,000 and containing carboxyl functionality;

II. a crosslinking agent having a pH of from about 4 to about 11 and comprising:
(a) water;
(b) a first ingredient containing aluminum cations having a valence of 3+ and comprising aluminum acetate;
(c) a second ingredient containing zirconium cations having a valence of 4+ and selected from the group consisting of:
  (i) zirconium lactate;
  (ii) a zirconium admixture comprising:
    (A) a zirconium compound selected from the group consisting of zirconium oxychloride, zirconium acetate, zirconium tetrachloride, zirconium orthosulfate, zirconium carbonate, zirconium ammonium carbonate, and mixtures thereof;
    (B) an alpha-hydroxy acid represented by the following formula:

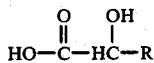

wherein:
R is selected from the group consisting of hydrogen and an alkyl group having 1 to about 3 carbon atoms;
    (C) an amine compound represented by the formula:

wherein:
$R_1$ is a hydroxyalkyl group having 1 to about 3 carbon atoms;
$R_2$ is selected from the group consisting of an alkyl group having 1 to about 3 carbon atoms and a hydroxyalkyl group having 1 to about 3 carbon atoms;
$R_3$ is selected from the group consisting of hydrogen, an alkyl group having 1 to about 3 carbon atoms, and a hydroxyalkyl group having 1 to about 3 carbon atoms; and,
  (iii) mixtures of (i) and (ii);
wherein said zirconium cations and said aluminum cations are present in said crosslinking composition in an amount sufficient to produce a weight ratio of zirconium cations to aluminum cations of from about 1 to 1 to about 10 to 1 and said crosslinking composition has a pH of from about 3 to about 11; and, III. a second aqueous mixture comprising a water dispersible hydrophilic organic polymer having a molecular weight of at least 100,000 and containing carboxyl functionality.

10. The method recited in claim 1 wherein said water dispersible hydrophilic organic polymer of the first and second mixture is selected from the group consisting of carboxyalkyl guar wherein the alkyl group has 1 to about 3 carbon atoms, carboxyalkylhydroxyalkyl guar wherein the alkyl groups have 1 to about 3 carbon atoms, xanthan gum, polyacrylamide wherein about 5 to about 75 percent of the carboxamide groups are hydrolyzed to carboxyl groups, polymethacrylamide wherein about 5 to about 75 percent of the carboxamide groups are hydrolyzed to carboxyl groups, cellulose ethers, a copolymer of about 5 to about 70 percent by weight acrylic acid or methacrylic acid copolymerized with acrylamide or methacrylamide, and mixtures thereof.

11. The method recited in claim 10 wherein said second ingredient is selected from the group consisting of zirconium lactate and an admixture of about 1 mole of zirconium oxychloride, about 2 moles of lactic acid, and about 2 moles of triethanolamine.

12. The method recited in claim 11 wherein the zirconium cations and aluminum cations in said crosslinking composition are present in the range of from about 3.0 to about 5.0 percent by weight of the polymer and the ratio of zirconium cations to aluminum cations is about 0.5.

* * * * *

UNITED STATES PATENT AND TRADEMARK OFFICE
CERTIFICATE OF CORRECTION

PATENT NO. : 4,664,713

DATED : May 12, 1987

INVENTOR(S) : Stephen W. Almond and David J. Hanlon

It is certified that error appears in the above-identified patent and that said Letters Patent is hereby corrected as shown below:

In column 3, line 66, the phrase "from about to 1" should read --from about 1 to 1--.

Signed and Sealed this

Third Day of November, 1987

Attest:

DONALD J. QUIGG

Attesting Officer

Commissioner of Patents and Trademarks